US011883893B2

(12) United States Patent
Strebler et al.

(10) Patent No.: US 11,883,893 B2
(45) Date of Patent: Jan. 30, 2024

(54) SAW BLADE (71) Applicant: CERATIZIT LUXEMBOURG S.A.R.L, Mamer (LU)

(72) Inventors: Philippe Strebler, Mamer (LU); Andre Duraes, Mamer (LU); Romain Steckler, Mamer (LU); Florian Bernardy, Mamer (LU)

(73) Assignee: Ceratizit Luxembourg S.a.r.l., Mamer (LU)

( * ) Notice: Subject to any disclaimer, the term of this patent is extended or adjusted under 35 U.S.C. 154(b) by 85 days.

(21) Appl. No.: 17/254,404

(22) PCT Filed: Apr. 29, 2019

(86) PCT No.: PCT/EP2019/060906
§ 371 (c)(1),
(2) Date: Dec. 21, 2020

(87) PCT Pub. No.: WO2019/242918
PCT Pub. Date: Dec. 26, 2019

(65) Prior Publication Data
US 2021/0129243 A1 May 6, 2021

(30) Foreign Application Priority Data

Jun. 19, 2018 (EP) .................................... 18178426

(51) Int. Cl.
*B23D 61/12* (2006.01)
*B23D 65/02* (2006.01)

(52) U.S. Cl.
CPC ......... *B23D 61/121* (2013.01); *B23D 61/127* (2013.01); *B23D 61/128* (2013.01); *B23D 65/02* (2013.01)

(58) Field of Classification Search
CPC .... B23D 61/006; B23D 61/02; B23D 61/021; B23D 61/12; B23D 61/121; B23D 61/126; B23D 61/127; B23D 61/128; B23D 65/02
(Continued)

(56) References Cited

U.S. PATENT DOCUMENTS

| 108,040 | A | * | 10/1870 | Milliman | ............. | B23D 61/121 |
| | | | | | | 83/848 |
| 211,259 | A | * | 1/1879 | Robbins et al. | ..... | B23D 61/121 |
| | | | | | | 83/851 |

(Continued)

FOREIGN PATENT DOCUMENTS

| AT | 16111 U1 * | 1/2019 | ............. B23P 15/28 |
| CN | 1119575 A | 4/1996 | |

(Continued)

OTHER PUBLICATIONS

Li Wenbin et al.: "Development of Forestry Engineering Research", Chinese Environmental Science Press, May 2005, pp. 138-139—Statement of Relevance.

(Continued)

*Primary Examiner* — Jason Daniel Prone
(74) *Attorney, Agent, or Firm* — Laurence A. Greenberg; Werner H. Stemer; Ralph E. Locher (57) ABSTRACT

A saw blade contains a body, in particular of a hard material, having a cutting portion. The cutting portion has a length and a width and being provided along its length with a plurality of teeth which are formed by a plurality of grooves. Each tooth being formed by at least two grooves. There is a first plurality of grooves, the grooves of which are parallel to each other along a first direction and in that there is a second plurality of grooves, the grooves of which are parallel to each other in a second direction. The first direction and the second direction are inclined to each other such that along (Continued)

the length of the cutting portion at least one of the grooves of the first plurality of grooves is intersected by a groove of the second plurality of grooves.

16 Claims, 4 Drawing Sheets

(58) Field of Classification Search
USPC .......................................................... D8/20
See application file for complete search history.

(56) References Cited

U.S. PATENT DOCUMENTS

| | | | | |
|---|---|---|---|---|
| 211,346 | A * | 1/1879 | Robbins | B23D 61/121 83/849 |
| 229,772 | A * | 7/1880 | Suisse | B23D 61/121 83/852 |
| 391,843 | A * | 10/1888 | Gray | B23D 61/121 83/852 |
| 775,012 | A * | 11/1904 | McLean | B23D 61/121 83/852 |
| 886,296 | A * | 4/1908 | Howatson | B23D 61/121 83/849 |
| 1,523,518 | A * | 1/1925 | Dragon | B23D 61/121 83/850 |
| 1,566,880 | A * | 12/1925 | Kelley | B23D 61/121 83/852 |
| 1,690,803 | A * | 11/1928 | Vander Wee | B23D 61/12 83/854 |
| 1,771,722 | A | 7/1930 | Prentice | |
| 2,252,869 | A * | 8/1941 | Shortell et al. | B23D 61/127 420/99 |
| 2,351,737 | A * | 6/1944 | Blum | B23D 61/121 83/848 |
| 2,718,245 | A * | 9/1955 | Owen et al. | B23D 61/121 83/848 |
| 3,631,906 | A * | 1/1972 | Forslund | B23D 61/12 83/846 |
| 3,663,316 | A * | 5/1972 | Kulmburg | B23D 61/127 83/835 |
| 4,015,331 | A | 4/1977 | Balke | |
| 4,232,096 | A * | 11/1980 | Franzen | B21B 27/00 428/685 |
| 4,265,285 | A * | 5/1981 | Fodor | B23D 61/121 30/166.3 |
| 4,311,075 | A * | 1/1982 | Sundstrom | B23D 61/121 83/848 |
| 5,361,665 | A * | 11/1994 | Sonefors | B23D 61/121 83/848 |
| 5,423,845 | A * | 6/1995 | McDaniel | B23D 61/121 83/835 |
| 5,687,484 | A * | 11/1997 | Hahn | B23D 61/121 30/355 |
| 5,848,473 | A | 12/1998 | Brandenburg, Jr. | |
| 5,855,157 | A | 1/1999 | Okamura et al. | |
| 6,427,573 | B1 | 8/2002 | Carlsen et al. | |
| D745,351 | S * | 12/2015 | Tyner | B23D 61/121 D8/20 |
| 10,245,747 | B2 * | 4/2019 | Miyawaki | B23D 61/121 |
| 10,414,063 | B2 * | 9/2019 | Miyawaki | B23D 61/121 |
| 2001/0015120 | A1 * | 8/2001 | Hickey | B23D 61/121 83/835 |
| 2002/0124708 | A1 * | 9/2002 | Hakansson | B23D 61/121 83/846 |
| 2008/0163735 | A1 * | 7/2008 | Lundin | B23D 61/121 83/848 |
| 2011/0154970 | A1 * | 6/2011 | Oshibe | B23D 61/121 83/835 |
| 2014/0157607 | A1 | 6/2014 | McFarland | |

FOREIGN PATENT DOCUMENTS

| | | |
|---|---|---|
| CN | 1169687 A | 1/1998 |
| CN | 1198979 A | 11/1998 |
| CN | 106536140 A | 3/2017 |
| CN | 107921655 A | 4/2018 |
| DE | 3445206 A1 | 6/1986 |
| DE | 19712448 A1 | 9/1998 |
| DE | 10303915 A1 | 8/2004 |
| ES | 2383627 T3 | 6/2012 |
| JP | S526194 A | 1/1977 |
| JP | 04122601 A * | 4/1992 ........... B23D 61/121 |
| JP | H06155401 A | 6/1994 |
| JP | H081605 A | 1/1996 |
| JP | 2013052575 A | 3/2013 |

OTHER PUBLICATIONS

Fu Chaochen: "Material Preparation Saw Technology", Heilongjiang Science and Technology Press, Dec. 1983, p. 21—Statement of Relevance.

Li Wenbin et al.: "Development of Forestry Engineering Research", Chinese Environmental Science Press, May 2005, pp. 138-139—English Translation.

Fu Chaochen: "Material Preparation Saw Technology", Heilongjiang Science and Technology Press, Dec. 1983, p. 21—English Translation.

Xiao Zhoufu et al. "Wood cutting toolkit", p. 299-302, the Northeast Forestry University Publisher, Dec. 1992—English translation.

* cited by examiner

SAW BLADE

BACKGROUND OF THE INVENTION

Field of the Invention

The invention relates to a saw blade comprising a body of hard material with the features of the preamble of the independent saw blade claim and a method to produce a saw blade with the features of the preamble of the independent method claim.

In the prior art, there are only very limited possible shapes for the teeth of saw blades with a cutting portion made of hard material. Conventional tooth shapes may give good lifetime results with respect to the cutting of steel, however, achievable feed rates are low. With respect to other materials such as wood or plastics, feed rate and cutting performance are even worse.

SUMMARY OF THE INVENTION

The object of the present invention is to provide saw blade comprising a body of hard material and a method to produce a saw blade in which these drawbacks are overcome.

Hard material is understood to be a material chosen from the group consisting of hard metal, high speed steel and/or ceramic. Hard metal is understood to be a composite material comprising cemented carbide (mostly tungsten carbide, WC) with a metal binder phase (usually Cobalt, Co).

This object is accomplished according to the invention by providing a saw blade with the features of the independent saw blade claim and a method to produce a saw blade with the features of the independent method claim. Preferred embodiments of the invention are defined in the dependent claims. A preferred use of a saw blade according to the invention is for cutting wood, soft metals (such as aluminum or magnesium) or plastics.

The invention provides a tooth geometry with excellent cutting performance and at the same time good manufacturability.

The invention provides
- a first plurality of grooves, the grooves of which are parallel to each other along a first direction and
- a second plurality of grooves, the grooves of which are parallel to each other in a second direction.

It is further provided that in that the first direction and the second direction are inclined to each other such that along the length of the cutting portion at least some of the grooves of the first plurality of grooves are intersected by a groove of the second plurality of grooves.

As the shape of the teeth is determined by the geometry of the grooves, the inventive arrangement of grooves results in an improvement of the shape of the teeth.

The first plurality of grooves being "intersected" by a groove of the second type of groove means that the second plurality of grooves crosses and thereby cuts into at least a part of the first plurality of grooves. Thereby, the appearance of a part or all of the grooves of the first plurality of grooves is altered.

In other words, the characteristic of the groove/tooth geometry of the saw blade results from the superimposition of the first plurality of grooves and the second plurality of grooves.

By way of example, the second plurality of groove may modify a groove base of the first plurality of grooves, or their flanks, or both.

It is understood that the second plurality of grooves may have the same groove shape and size as the first type of grooves (of the first plurality of grooves). It can be foreseen, however, that the second type of grooves differs from the first in terms of shape and/or size.

The resulting tooth shape provides an even distribution of cutting forces onto the individual cutting teeth. Also beneficial is the good chip evacuation with the inventive tooth design, the teeth shape resulting from the arrangement of the grooves.

According to an embodiment, the first direction and the second direction are inclined to a direction that is parallel to the width of the cutting portion and are inclined to a direction that is parallel to the length of the cutting portion.

It can be foreseen, however, that one of the first direction and the second direction is parallel to the width of the cutting portion. In other words, in this latter option, one type of grooves is parallel to the width of the cutting portion. In this case, one type of grooves is essentially perpendicular to an oscillating/reciprocating movement of the saw blade.

According to an embodiment it is provided that along the length of the cutting portion, grooves of the first plurality of grooves which are intersected by grooves of the second plurality of grooves are alternated with grooves of the first plurality of grooves which are not intersected by a groove of the second plurality of grooves.

In other words, according to this embodiment, not all of the grooves of the first plurality of grooves are crossed by the second type of grooves.

Grooves of the first type (grooves of the first plurality of grooves) can be followed by the second type directly, that is in an "A-B-A-B-A-B etc." order, or the sequence may be different, for example an "A-A-B-A-A-B-A-A-B etc." order, "A" and "B" thereby denoting grooves of the first or the second type.

According to yet another embodiment it is provided that along the length of the cutting portion two or three adjacent grooves of the first plurality of grooves are intersected by one groove of the second plurality of grooves. As it will be explained in more detail by way of the attached drawings, the orientation of the second plurality of grooves is chosen such that one groove of the second plurality of grooves crosses two or more grooves of the first type of grooves. It can be understood that the resulting grooves differ from each other as the second groove crosses at different lateral position of the grooves of the first plurality of grooves. Thus, more than two groove characteristics can be realized.

Preferably it is provided that an angle between the first direction and the second direction lies in a range of about 1° to about 90°, preferably in a range of about 5° to about 45°, especially preferred in a range of about 10° to about 30°.

It has been shown that within the above angle ranges especially balanced cutting properties of the saw blade can be achieved.

Preferably it is provided that a distance between grooves of the second plurality of grooves is larger than a distance between grooves of the first plurality of grooves, preferably the distance between grooves of the second plurality of grooves is double the distance between grooves of the first plurality of grooves.

In other words, along a given longitudinal distance of the saw blade, there are more grooves of the type of the first plurality of grooves than of the other type of grooves. In a yet preferable variant, the number of the first groove type would be double the number of the second type.

It can be provided that a cross section of each of the grooves of the first plurality of grooves which are not intersected by a groove of the second plurality of grooves is basically V-shaped.

As grinding is the preferred option of forming the grooves, the (initial) groove shape follows the shape of the grinding wheel.

Preferably, all the grooves of the plurality of grooves are equally shaped.

Even more preferred, the grooves of the second type (of the second plurality of grooves) have the same initial shape, e.g. described as cross section, as the grooves of the first plurality of grooves. Obviously, its initial shape is not necessarily directly visible at the saw blade—as it is superimposed with the other groove type—but it still can be determined by analysis of the final groove shape.

According to a variant, the cross section of the grooves of the second type (of the second plurality of grooves) have a different initial or imaginary shape to the shape of grooves of the first plurality of grooves. For example, the shape of the grooves of the second type may be a more acute V-shape than the V-shape of the first type of grooves.

In a preferred embodiment it is provided that the cross-section of the body of hard material widens into a direction of the cutting teeth tips. The cross-section of the body may be of trapezoidal shape. The effect of this preferred shape is that the saw blade has a side clearance in its feed direction. This leads to reduced friction during operation of a saw blade equipped with said body of hard metal.

In ductile materials such as steel, by contrast, a side clearance is realized by the so-called tooth-set (German: "Schränkung"). According to this technique, the individual teeth of a saw blade are plastically bent alternatingly to the left and to the right (with respect to the longitudinal direction of the blade) to create a cutting width broader than the metal strip the blade is made from.

The present preferred embodiment thus provides a side clearance solution for hard and brittle materials.

As an alternative to grinding the grooves or teeth could be realized by electroerosion or direct pressing. However, grinding is preferred.

In an embodiment it can be provided that lateral sides (flanks) of adjacent teeth which together form a groove (in other words the flanks facing each other) are either both faceted (consist each of at least two angled partial plane surfaces) or are both formed by a single plane surface.

The saw blade according to the invention has an aggressive tooth design and cuts very effectively. As compared to conventional full-steel saw blades, the inventive saw blades show increased service life and improved edge retention.

The saw blade can be in the form of an oscillating or reciprocating saw blade, such as an oscillating blade saw, a jig saw, or a saber saw.

Further, the invention provides a very cost-effective way to manufacture saw blades comprising a body of a hard material, in particular saw blades comprising a body of hard metal.

The inventive method to produce a saw blade, in particular a saw blade according to at least one of the preceding embodiments, is done by grinding a surface of a body of hard material to form a plurality of teeth, the surface having a length and a width. The method uses at least one grinding tool having a plurality of spaced grinding surfaces which are parallel to each other along a grinding direction. In a first step the grinding tool is applied to the surface in a first grinding direction that is preferably inclined to a direction which is parallel to the width of the surface. In a further step a grinding tool having a plurality of spaced grinding surfaces which are parallel to each other along a grinding direction is applied to the surface in a second grinding direction that is preferably inclined to the direction which is parallel to the width of the surface and is inclined to the first grinding direction.

It can be provided that with respect to grinding there are only the first step, the second step and the further step.

It can be provided that a grinding tool with equally spaced grinding surfaces is used.

It can be provided that at least in two of the following steps: first step, second step and further step, the same grinding tool is used.

DETAILED DESCRIPTION OF THE INVENTION

Figure 1:
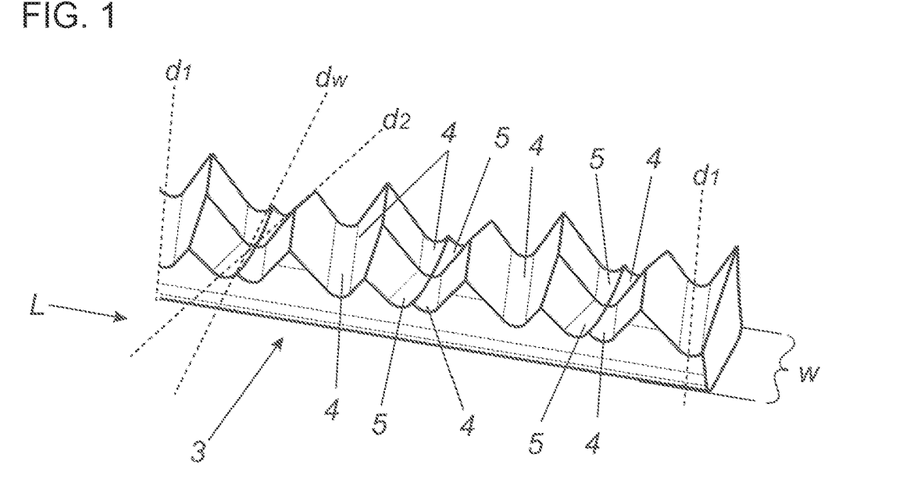
FIG. 1 shows a cutting portion of a first embodiment of the invention

FIG. 1 shows a cutting portion 3 of a saw blade 1 (cf. FIG. 5) having a width W. Only part of the length L is shown. In a body 2 of hard material a first plurality of grooves 4 running parallel to direction $d_1$ has been ground and a second plurality of grooves 5 running parallel to direction $d_2$ has been ground.

Both directions, $d_1$ and $d_2$, are inclined with respect to each other and with respect to a direction $d_W$ that is parallel to the width W of the cutting portion 3 and with respect to a direction $d_L$ that is parallel to the length L of the cutting portion 3.

Teeth of the cutting portion 3 are being formed as flanks of the grooves 4, 5. It can be seen that in this embodiment lateral sides of adjacent teeth which together form a groove 4, 5 are either both faceted or are both formed by a single plane surface.

It can be seen that in the embodiment of FIG. 1 the first direction $d_1$ and the second direction $d_2$ are chosen such that along the length L of the cutting portion 3, teeth of a first type result which are truncated on one of their lateral sides and teeth of a second type result, which alternate with teeth of the first type and which are truncated on the other of their lateral sides, the lateral sides being adjacent to an imaginary longitudinal edge of the cutting portion 3 running along the length L of the cutting portion 3, and such that all teeth are of asymmetrical shape in a direction $d_L$ that is parallel to the length L of the cutting portion 3. An advantage of such an arrangement lies in the fact that the cutting process is being shared between the teeth of the first and the second type in that, in one direction of the cutting process only the first or second type teeth are engaging the material to be cut and in the other direction of the cutting process the other one of the first or second type teeth are engaging the material to be cut, provided there is a reciprocating motion of the cutting portion 3 along its length L. Another advantage lies in the fact that chip removal is facilitated.

In the embodiment of FIG. 1, only every second groove 4 of the first plurality of grooves 4 is intersected by a groove 5 of the second plurality of grooves 5.

Figure 2:
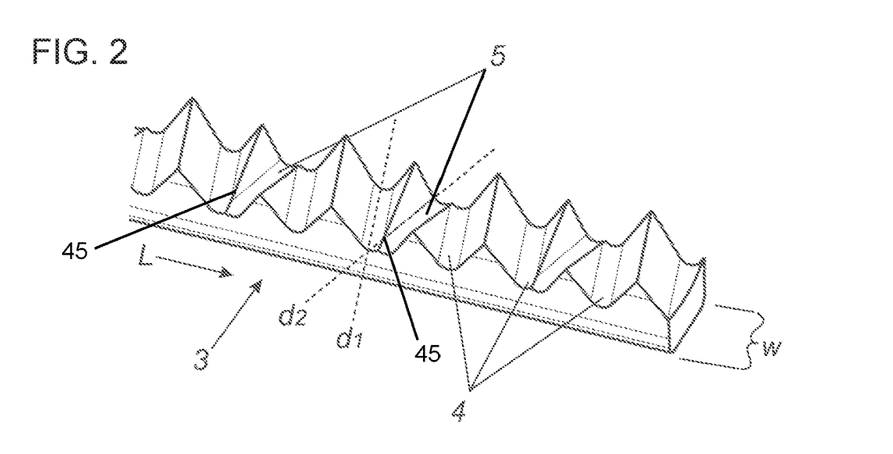
FIG. 2 shows a cutting portion of a second embodiment of the invention

In the embodiment of FIG. 2, two grooves 4 of the first plurality of grooves 4 which are separated from each by a single groove 5 of the second plurality of grooves 5 are intersected by this single groove 5 of the second plurality of grooves 5 at intersections 45, one in a region near the one portion of the cutting portion 3 and the other in a region near the other portion of the cutting portion 3, both regions being separated from each other by a little less than the width W of the cutting portion 3.

The resulting groove/tooth characteristic provides for aggressive cutting performance and thus high feed rates.

Figure 3:
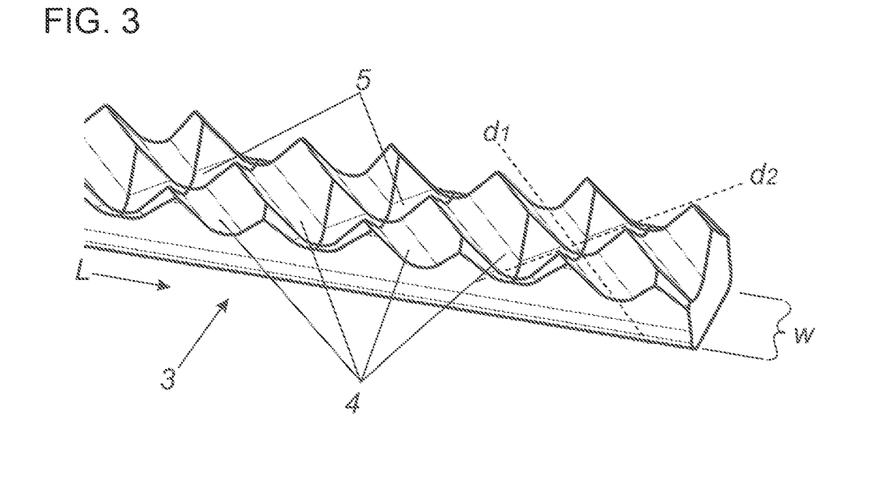
FIG. 3 shows a cutting portion of a third embodiment of the invention

In the embodiment of FIG. 3, three adjacent grooves 4 of the first plurality of grooves 4 are being intersected and thus connected by a single groove 5 of the second plurality of grooves 5.

In the present example the directions $d_1$ and $d_2$ are both chosen at large angles. It has been found that the resulting groove/tooth characteristic shows low friction. This leads to reduced power consumption and reduced frictional heat.

Figure 4:
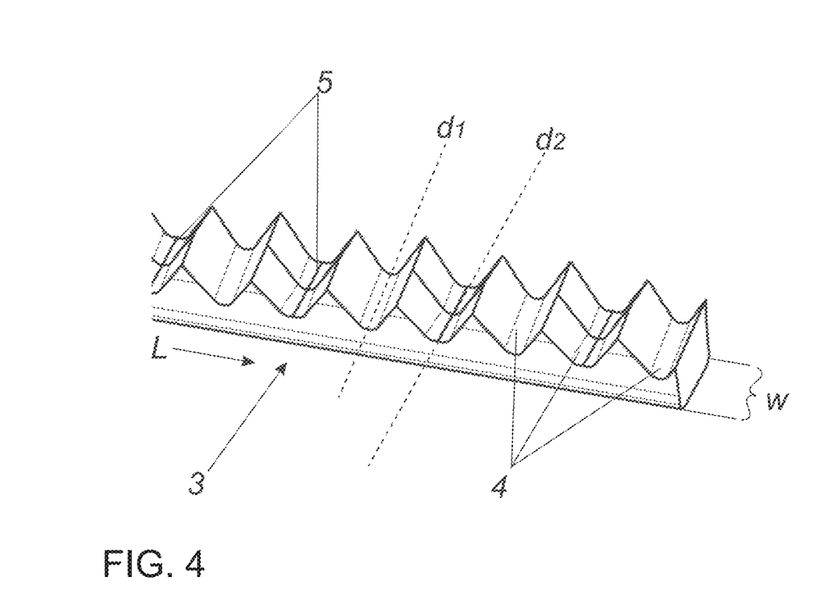
FIG. 4 shows a cutting portion of a fourth embodiment of the invention

In the embodiment of FIG. 4, similar to the embodiment of FIG. 1, only every second groove 4 of the first plurality of grooves 4 is intersected by a groove 5 of the second plurality of grooves 5. It can be seen that in this embodiment lateral sides of adjacent teeth which together form a groove 4, 5 are either both faceted or are both formed by a single plane surface. The embodiment represents a robust tooth geometry with good lifetime.

Figure 5:
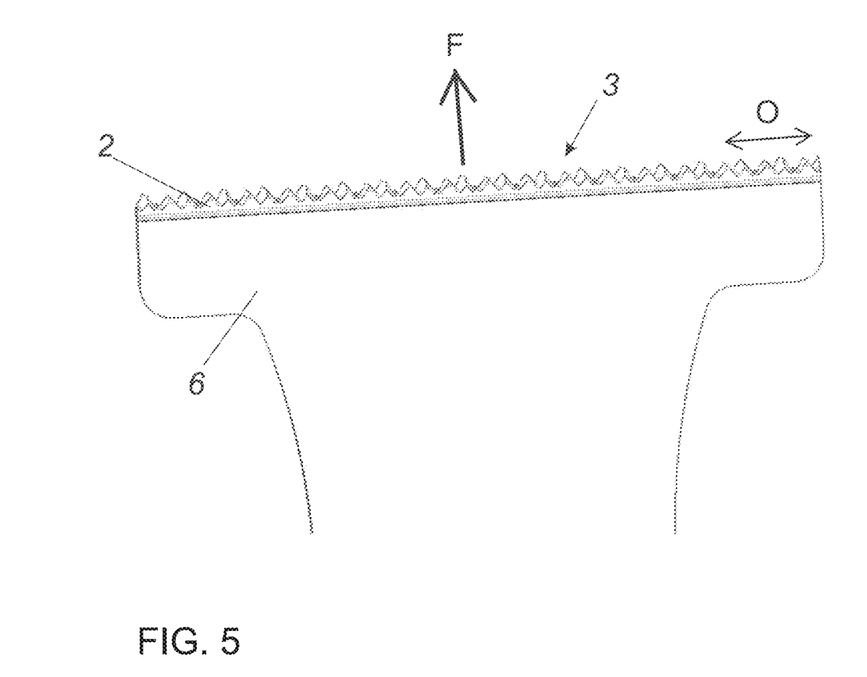
FIG. 5 shows a saw blade according to the invention

FIG. 5 shows part of an inventive saw blade having a cutting portion 3 which is formed on a body 2 of hard material, the body 2 of hard material being welded to a carrier 6 made of steel. In FIG. 5 there are shown, in exemplary manner also applicable to the other embodiments, the feed direction F and the oscillation direction O.

During operation, the saw blade oscillates or reciprocates along the oscillation direction O. Commonly one speaks of oscillation when the displacements are very small, typically in the range of a few millimeters, while in case of reciprocating saws the displacements measure several millimeters.

In use, the saw blade moves through a workpiece in feed direction F at a certain feed rate.

Figure 6:
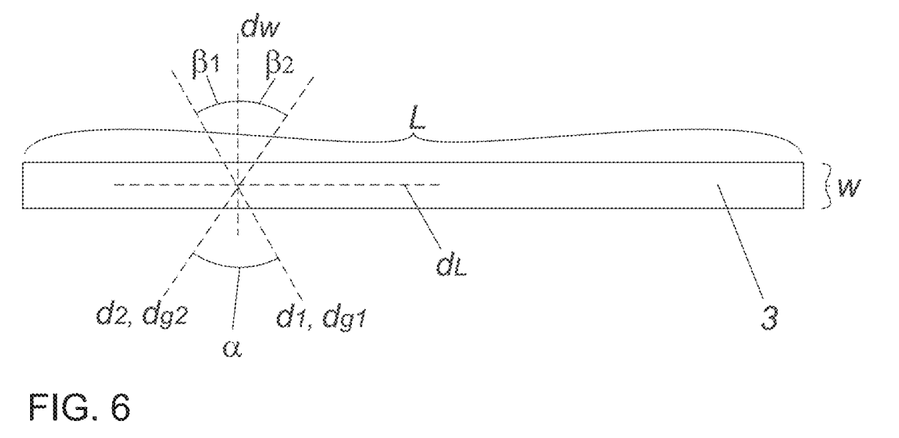
FIG. 6 shows geometrical features of a cutting portion according to the invention

In FIG. 6 the different directions that occur with respect to the invention are being shown with respect to a schematic depiction of the cutting portion 3. The cutting portion is shown in a top view, that is, parallel and opposite to a later feed direction.

Figure 7:
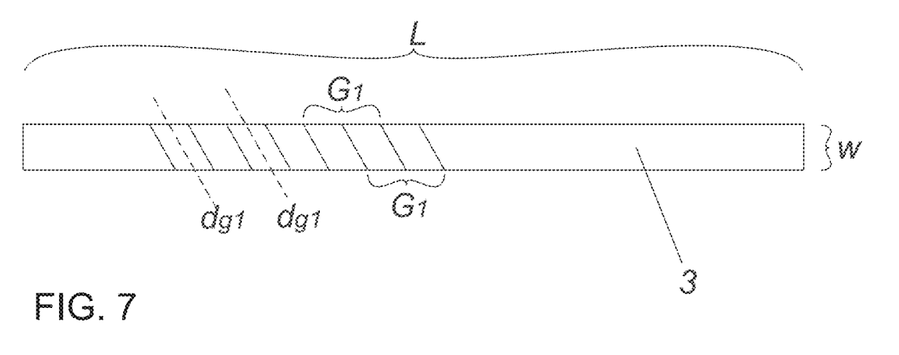
FIG. 7 shows a first step of a method to produce an inventive saw blade

FIG. 7 shows the result of a first and a second step of a method to produce a saw blade, in particular a saw blade according to at least one of discussed embodiments, by grinding a surface of a body 2 of hard material to form a plurality of teeth, the surface having a length L and a width W, the method using a grinding tool having a plurality of spaced grinding surfaces which are parallel to each other along a grinding direction $d_g$. If a saw blade made of a body 2 of hard material affixed to a carrier 6 is being used, the grinding can take place after the body 2 of hard material has been affixed to the carrier 6.

In the first step the grinding tool is applied to the surface in a first grinding direction $d_{g1}$ that is inclined to a direction $d_W$ which is parallel to the width W of the surface. A first subset of the first plurality of equidistant, parallel grooves 4 is being ground, the grooves 4 having a distance $2*G_1$ from each other.

Then, as a second step, the grinding tool is being offset with respect to the surface along the length L of the surface, the offset corresponding to half of a distance between the spaced grinding surfaces of the grinding tool, that is half tooth pitch. A second subset of the first plurality of equidistant, parallel grooves 4 is being ground, the grooves 4 having a distance $G_1$ from each other. The situation shown in FIG. 7 arises (however, not all of the grooves 4 ground along the length L are being shown).

As shown above, through a further grinding operation offset to the first grinding operation the resulting tooth pitch can be halved as it would result from one grinding operation alone. It shall be noted that the offset can be chosen other than half the distance between the spaced grinding surfaces of the grinding tool, that is, other than half tooth pitch, resulting unequally spaced grooves 4 respectively teeth.

Figure 8:
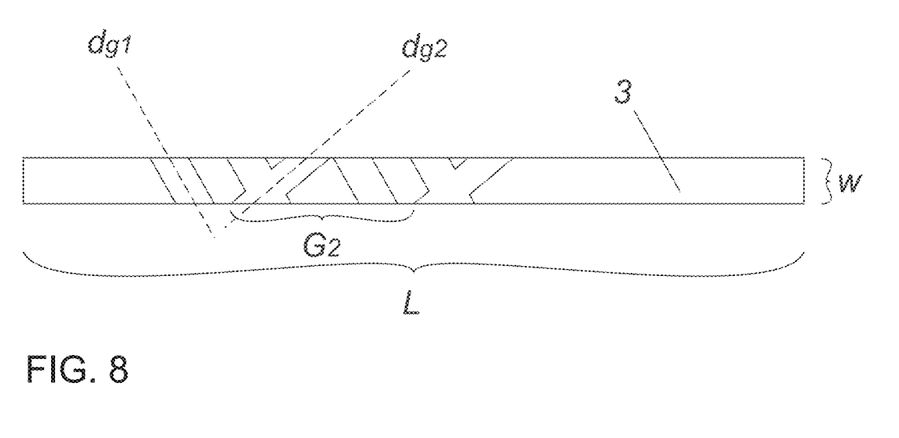
FIG. 8 shows a further step of a method to produce an inventive saw blade

In a third step (FIG. 8) the grinding tool is inclined to be parallel to a second grinding direction $d_{g2}$ that is inclined to the direction $d_W$ which is parallel to the width W of the surface and is inclined to the first grinding direction $d_{g1}$. In FIG. 8 not all of the grooves 4, 5 which are ground along the length L are being shown.

Production of the saw blade is now finished. In this embodiment only three grinding steps (first step, second step and further step) had to be used.

Figure 9:
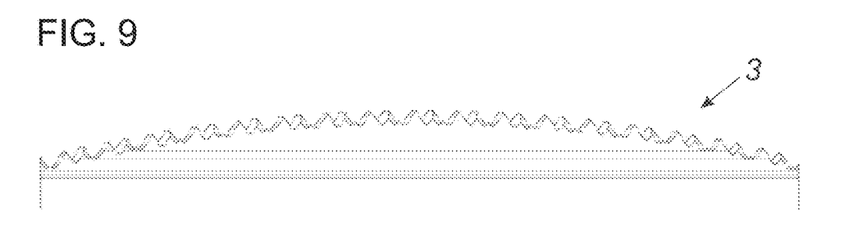
FIG. 9 shows a cutting portion of a fifth embodiment of the invention

FIG. 9 shows an embodiment of an inventive saw blade with a convexly curved cutting portion 3.

Figure 10:
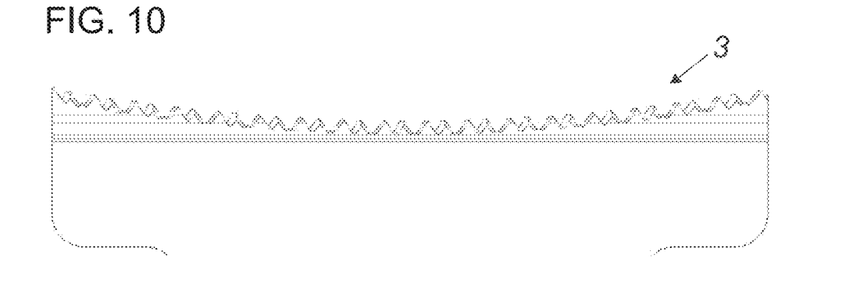
FIG. 10 shows a cutting portion of a sixth embodiment of the invention FIG. 11a,b show a schematic image of a grinding wheel that could be used for the manufacture of a saw blade in perspective and in detail

FIG. 10 shows an embodiment of an inventive saw blade with a concavely curved cutting portion 3.

Figure 11A:
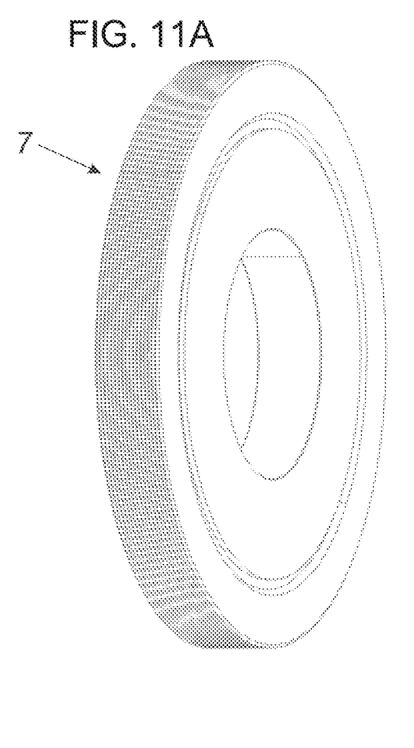
Figure 11B:
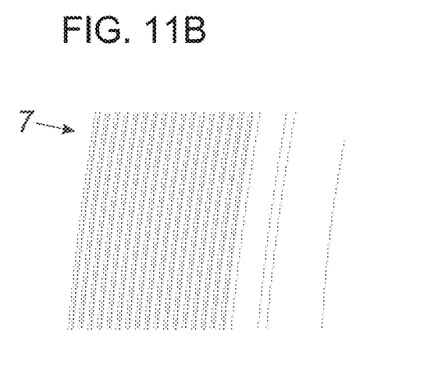

FIGS. 11a and 11b show an example for a grinding tool 7 which can be used in a method according to the invention with a plurality of grinding surfaces. The grinding surfaces are parallel to each other and are equally spaced along an axis of the grinding tool 7.

Figure 12:
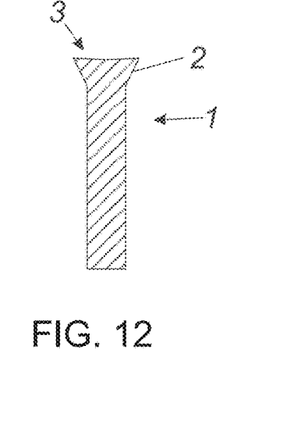
FIG. 12 shows a schematic cross-section of an inventive saw blade in the region of the cutting portion

FIG. 12 shows a cross-section of an inventive saw blade 1 in the region of the cutting portion 3 (the individual grooves 4, 5 and teeth which are of course present in the body 2 of hard material are not shown). It can be seen that in this embodiment the cross-section of the body 2 of hard material widens into a direction of the teeth, thus creating a side clearance with the saw blade.

REFERENCE SIGNS 3 saw blade
2 body of hard metal
3 cutting portion
4 grooves of the first plurality of grooves
5 grooves of the second plurality of grooves
6 carrier
7 grinding tool
L length of cutting portion
W width of cutting portion
F Feed direction
O Oscillation direction $d_1$ first direction (of grooves of the first plurality of grooves)
$d_2$ second direction (of grooves of the second plurality of grooves)
$d_W$ direction that is parallel to the width of the cutting portion
$d_{g1}$ first grinding direction
$d_{g2}$ second grinding direction
$\alpha$ angle between the first direction $d_1$ (or first grinding direction $d_{g1}$) and the second direction $d_2$ (or second grinding direction $d_{g2}$)
$G_1$ distance between grooves of the first plurality of grooves
$G_2$ distance between grooves of the second plurality of grooves

The invention claimed is:

1. A saw blade, comprising:
a body of a hard material being cemented carbide, the body having a cutting portion, the cutting portion having a length and a width and being provided with a plurality of teeth along the length, the cutting portion having two sides extending parallel to the length and arranged opposite one another, the cutting portion having a plurality of grooves formed therein defining the teeth, each tooth of the teeth being formed by at least two of the grooves, the grooves including a plurality of first grooves, the first grooves being parallel to each other along a first direction and intersecting each of the two sides, the grooves including a plurality of second grooves, the second grooves being parallel to each other in a second direction and intersecting each of the two sides, the first direction and the second direction being inclined to each other such that along the length of the cutting portion at least one of the first grooves is intersected by a second groove of the plurality of second grooves, the at least one of the first grooves and the intersecting second groove each having a rounded groove base and the grooves being formed by grinding, the teeth of the cutting portion being defined by flanks of the grooves.

2. The saw blade according to claim 1, wherein the first direction and the second direction are inclined to a direction that is parallel to the width of the cutting portion and are inclined to a direction that is parallel to the length of the cutting portion.

3. The saw blade according to claim 1, wherein the first direction and the second direction lie in a common plane which is parallel to a plane which is formed by a direction that is parallel to the width of the cutting portion and a direction that is parallel to the length of the cutting portion.

4. The saw blade according to claim 1, wherein along the length of the cutting portion, the first grooves of the plurality of first grooves which are intersected by the second grooves of the plurality of second grooves are alternated with the first grooves of the plurality of first grooves which are not intersected by a second groove of the plurality of second grooves.

5. The saw blade according to claim 1, wherein along the length of the cutting portion at least two adjacent the first grooves of the plurality of first grooves are intersected by one second groove of the plurality of second grooves.

6. The saw blade according to claim 1, wherein an angle between the first direction and the second direction lies in a range of about 1° to about 90°.

7. The saw blade according to claim 6, wherein the angle lies in a range of about 10° to about 30°.

8. The saw blade according to claim 1, wherein an angle between the first direction and a direction that is parallel to the width of the cutting portion lies in a range of about 0° to about 90° and/or an angle between the second direction and the direction that is parallel to the width of the cutting portion lies in a range of about 0° to about 90°.

9. The saw blade according to claim 8, wherein the angle between the first direction and the direction that is parallel to the width of the cutting portion lies in a range of about 5° to about 45° and/or the angle between the second direction and the direction that is parallel to the width of the cutting portion lies in a range of about 5° to about 45°.

10. The saw blade according to claim 1, wherein a distance between adjacent ones of the second grooves is larger than a distance between adjacent ones of the first grooves.

11. The saw blade according to claim 1, wherein the first direction and the second direction are chosen such that along the length of the cutting portion, the teeth of a first type result which are truncated on one of their lateral sides and the teeth of a second type result, which alternate with the teeth of the first type and which are truncated on the other of their lateral sides, truncations being adjacent to a longitudinal edge of the cutting portion running along the length of the cutting portion, such that all the teeth are of asymmetrical shape with respect to a direction that is parallel to the length of the cutting portion.

12. The saw blade according to claim 1, wherein a cross-section of the body at least over a section of the length of the cutting portion widens into a direction of the teeth.

13. The saw blade according to claim 1, further comprising a carrier; and
wherein the body is affixed to the carrier.

14. The saw blade according to claim 13, wherein the carrier is made of steel.

15. The saw blade according to claim 1, wherein a distance between the second grooves is double a distance between the first grooves.

16. A saw blade, comprising:
a body having a cutting portion, the cutting portion having a length and a width and being provided with a plurality of teeth along the length, the cutting portion having two sides extending parallel to the length and arranged opposite one another, the cutting portion having a plurality of grooves formed therein defining the teeth, each tooth of the teeth being formed by at least two of the grooves, the grooves including a plurality of first grooves, the first grooves being parallel to each other along a first direction and intersecting each of the two sides, the grooves including a plurality of second grooves, the second grooves being parallel to each other in a second direction and intersecting each of the two sides, the first direction and the second direction being inclined to each other such that along the length of the cutting portion at least one of the first grooves is intersected by a second groove of the plurality of second grooves for defining one of the teeth, two of the first grooves being adjacent one another for defining another one of the teeth therebetween.

* * * * *

UNITED STATES PATENT AND TRADEMARK OFFICE
CERTIFICATE OF CORRECTION

PATENT NO. : 11,883,893 B2
APPLICATION NO. : 17/254404
DATED : January 30, 2024
INVENTOR(S) : Philippe Strebler et al.

It is certified that error appears in the above-identified patent and that said Letters Patent is hereby corrected as shown below:

In the Specification

Column 1, Lines 7-11, should read as follows:
The invention relates to a saw blade comprising a body of hard material with the features of the saw blade claim and a method to produce a saw blade with the features of the method claim.

Column 1, Lines 30-38, should read as follows:
This object is accomplished according to the invention by providing a saw blade with the features of the independent saw blade claim. Preferred embodiments of the invention are defined in the dependent claims. A preferred use of a saw blade according to the invention is for cutting wood, soft metals (such as aluminium or magnesium) or plastics.

In the Claims

Column 7, Claim 5, Lines 58-61, should read as follows:
5. The saw blade according to claim 1, wherein along the length of said cutting portion at least two adjacent said first grooves of said plurality of first grooves are intersected by one second groove of said plurality of second grooves.

Signed and Sealed this
Twenty-seventh Day of August, 2024

Katherine Kelly Vidal
*Director of the United States Patent and Trademark Office*